United States Patent
Newlin et al.

(10) Patent No.: US 12,437,623 B2
(45) Date of Patent: Oct. 7, 2025

(54) DUAL BAND INFRA RED OPTICAL FIRE DETECTOR

(71) Applicant: Kidde Technologies, Inc., Wilson, NC (US)

(72) Inventors: Scott K. Newlin, Willow Springs, NC (US); Donald G. Kramer, Wake Forest, NC (US); Judy Cherian, Morrisville, NC (US); Benjamin Codispoti, Raleigh, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 341 days.

(21) Appl. No.: 18/157,924

(22) Filed: Jan. 23, 2023

(65) Prior Publication Data

US 2024/0249607 A1    Jul. 25, 2024

(51) Int. Cl.
*G08B 17/12* (2006.01)
*A62C 3/08* (2006.01)

(52) U.S. Cl.
CPC ............ *G08B 17/12* (2013.01); *A62C 3/08* (2013.01)

(58) Field of Classification Search
CPC .... G08B 17/12; G08B 29/145; G08B 29/183; A62C 3/08; B64D 2045/009; G01J 5/0018; G01J 5/0014
See application file for complete search history.

(56) References Cited

U.S. PATENT DOCUMENTS

| | | |
|---|---|---|
| 4,206,454 A | 6/1980 | Schapira et al. |
| 4,249,168 A | 2/1981 | Muggli |
| 4,296,324 A * | 10/1981 | Kern .............. G08B 17/12 250/340 |
| 4,529,881 A | 7/1985 | Ceurvels et al. |
| 4,583,597 A | 4/1986 | Spector et al. |
| 4,647,776 A | 3/1987 | Kern et al. |
| 4,701,624 A | 10/1987 | Kern et al. |
| 5,051,590 A * | 9/1991 | Kern .............. G08B 17/12 374/161 |
| 5,372,426 A | 12/1994 | Broudy et al. |
| 5,850,182 A | 12/1998 | Schuler |
| 5,995,008 A | 11/1999 | King et al. |

(Continued)

OTHER PUBLICATIONS

Extended European Search Report corresponding to EP Application No. 24153371.0; Issue Date, Jul. 8, 2024; 59 pages.

*Primary Examiner* — David P Porta
(74) *Attorney, Agent, or Firm* — CANTOR COLBURN LLP

(57) ABSTRACT

A flame detector for an aircraft includes a housing and two sensors positioned in the housing to detect light signals indicative of a flame event. The two sensors include a first sensor configured to detect light signals in at a first infrared wavelength range, and a second sensor configured to detect light signals at a second wavelength range. A controller is configured to receive signals from the two sensors, and to determine the presence of the flame event only if the signals indicative of the flame event are received from both of the two sensors. A method of detecting a flame event includes providing two sensors in a detector housing. A detection area is observed via the sensors, and detection signals received from the sensors are evaluated at a controller. The presence of a flame event is determined only if detection signals are received from both of the two sensors.

17 Claims, 5 Drawing Sheets

(56) References Cited

U.S. PATENT DOCUMENTS

| | | |
|---|---|---|
| 7,511,276 B2 | 3/2009 | Staerzl |
| 7,638,770 B2 | 12/2009 | Serero et al. |
| 8,400,502 B2 | 3/2013 | Zakrzewski et al. |
| 10,345,152 B2 | 7/2019 | Waldron |

* cited by examiner

DUAL BAND INFRA RED OPTICAL FIRE DETECTOR

BACKGROUND

Exemplary embodiments pertain to the art of aircraft, and more particularly to optical flame detectors utilized in engine compartments of aircraft.

Flame detectors are utilized in aircraft in locations such as engine compartments to detect fire in the engine compartment. Present flame detectors utilized in, for example, helicopters or fixed wing aircraft especially, are prone to false alarms in which the detector indicates the presence of a fire where none exists. The main sources of such false alarms are temperature variation of hot surfaces on which the detector is focused, and temperature fluctuations in the engine compartment due to engine exhaust leaks and/or engine exhaust reingestion.

The possibility and occurrence of false alarms creates a significant additional burden on the flight crew of the aircraft and impacts their confidence in the system. This can lead to ignored alarms or execution of emergency procedures when a true fire hazard or other unsafe conditions does not actually exist. The false indication of a fire may lead a crew to land the aircraft in unsafe conditions, resulting in injuries and/or damage to the aircraft.

BRIEF DESCRIPTION

In one embodiment, a flame detector for an aircraft includes a housing and two sensors positioned in the housing to detect light signals indicative of a flame event. The two sensors include a first sensor configured to detect light signals in at a first infrared wavelength range, and a second sensor configured to detect light signals at a second wavelength range. A controller is configured to receive signals from the two sensors, and to determine the presence of the flame event only if the signals indicative of the flame event are received from both of the two sensors.

Additionally or alternatively, in this or other embodiments, the two sensors detect emissions having different wavelength signatures.

Additionally or alternatively, in this or other embodiments, a first sensor of the two infrared sensors is configured to detect infrared emissions having a 4.3-4.4 micron signature.

Additionally or alternatively, in this or other embodiments, a second sensor of the two sensors is configured to detect emissions having a 0.88 micron signature.

Additionally or alternatively, in this or other embodiments, the two sensors share a common window in the housing.

Additionally or alternatively, in this or other embodiments, a light source is positioned in the housing to emit light signals for test of the flame detector.

Additionally or alternatively, in this or other embodiments, the controller is positioned in the housing.

In another embodiment, a flame detector system or an aircraft includes an engine located in an engine compartment, and a flame detector located in the engine compartment. The flame detector includes a housing and two sensors located in the housing to detect light signals indicative of a flame event. The two sensors include a first sensor configured to detect light signals in at a first infrared wavelength range, and a second sensor configured to detect light signals at a second wavelength range. A controller is configured to receive signals from the two sensors, and to determine the presence of the flame event only if signals indicative of the flame event are received from both of the two sensors.

Additionally or alternatively, in this or other embodiments, the two sensors detect emissions having different wavelength signatures.

Additionally or alternatively, in this or other embodiments, a first sensor of the two sensors is configured to detect infrared emissions having a 4.3-4.4 micron signature.

Additionally or alternatively, in this or other embodiments, a second sensor of the two sensors is configured to detect emissions having a 0.88 micron signature.

Additionally or alternatively, in this or other embodiments, the two sensors share a common window in the housing.

Additionally or alternatively, in this or other embodiments, a light source is positioned in the housing to emit light signals for test of the flame detector.

Additionally or alternatively, in this or other embodiments, the controller is located in the housing.

In yet another embodiment, a method of detecting a flame event includes providing two sensors in a detector housing. The two sensors include a first sensor configured to detect light signals in at a first infrared wavelength range, and a second sensor configured to detect light signals at a second wavelength range. A detection area is observed via the two sensors, and detection signals received from the two sensors are evaluated at a controller. The presence of a flame event is determined only if detection signals are received from both of the two sensors.

Additionally or alternatively, in this or other embodiments, one or more alarms or alerts are initiated when the presence of a flame event is determined.

Additionally or alternatively, in this or other embodiments, the two sensors detect emissions having different wavelength signatures.

Additionally or alternatively, in this or other embodiments, a first sensor of the two sensors is configured to detect infrared emissions having a 4.3-4.4 micron signature.

Additionally or alternatively, in this or other embodiments, a second sensor of the two sensors is configured to detect emissions having a 0.88 micron signature.

Additionally or alternatively, in this or other embodiments, the flame detector is tested via a light source located in the housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
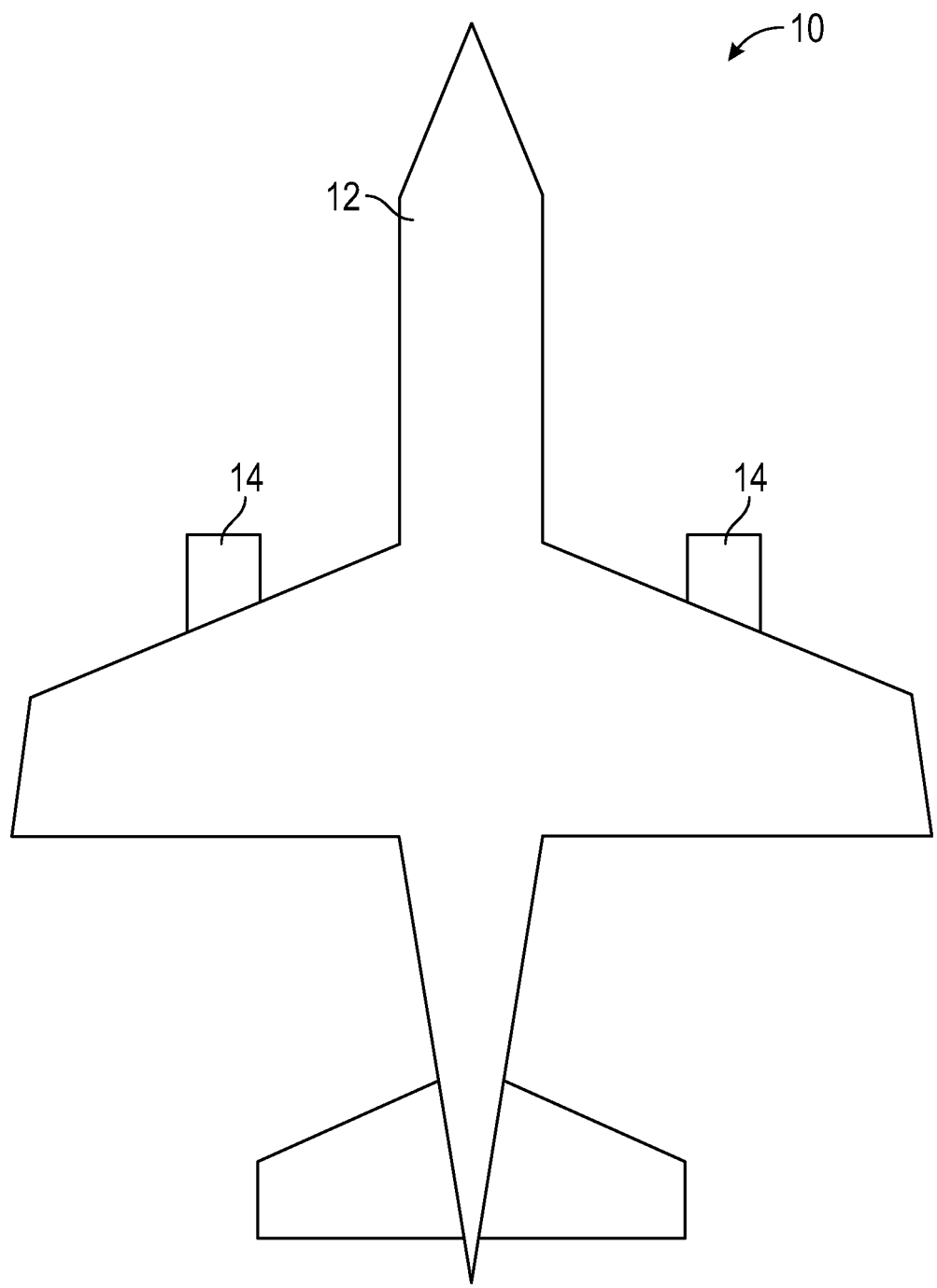
FIG. 1 is a schematic illustration of an embodiment of an aircraft
Figure 2:
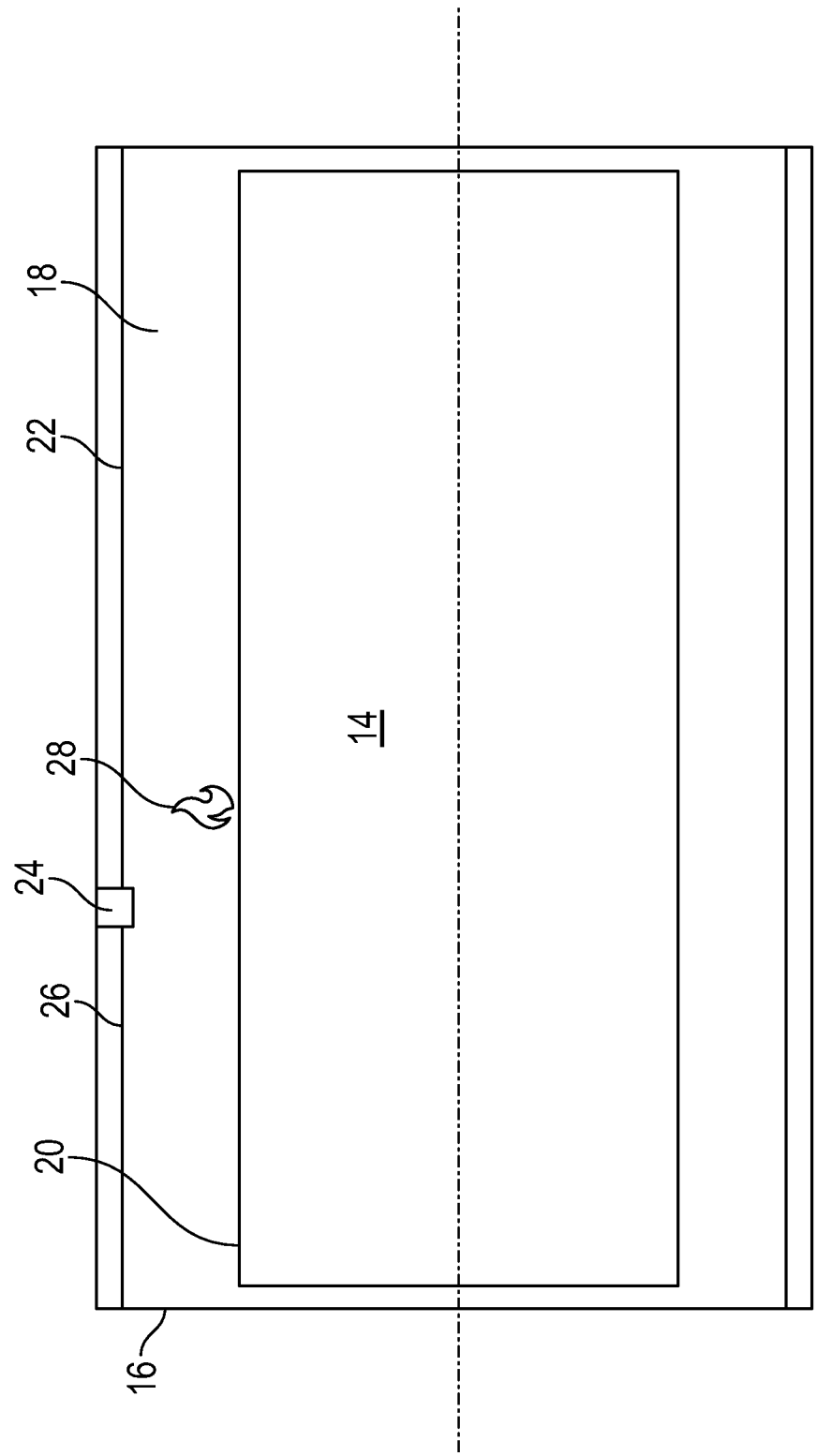
FIG. 2 is a schematic illustration of an embodiment of an engine compartment of an aircraft.

Referring to FIG. 1, illustrated is an embodiment of an aircraft 10. The aircraft 10 includes an airframe 12 and one or more engines 14, for example gas turbine engines 14, to provide propulsion for the aircraft 10. Referring now to the cross-sectional view of FIG. 2, the engines 14 are each enclosed in a nacelle 16. The nacelle 16 defines an engine compartment 18 at least partially surrounding the engine 14 between an outer casing surface 20 of the engine 14 and an inner nacelle surface 22 of the nacelle 16. One or more flame detectors 24 are located in the engine compartment 18, for example in a compartment wall 26 of the engine compartment 18 and are configured to detect the presence of fire in the engine compartment 18. The flame detector 24 detects emissions of infrared radiation in the engine compartment 18 from, for example, a fire 28.

Figure 3:
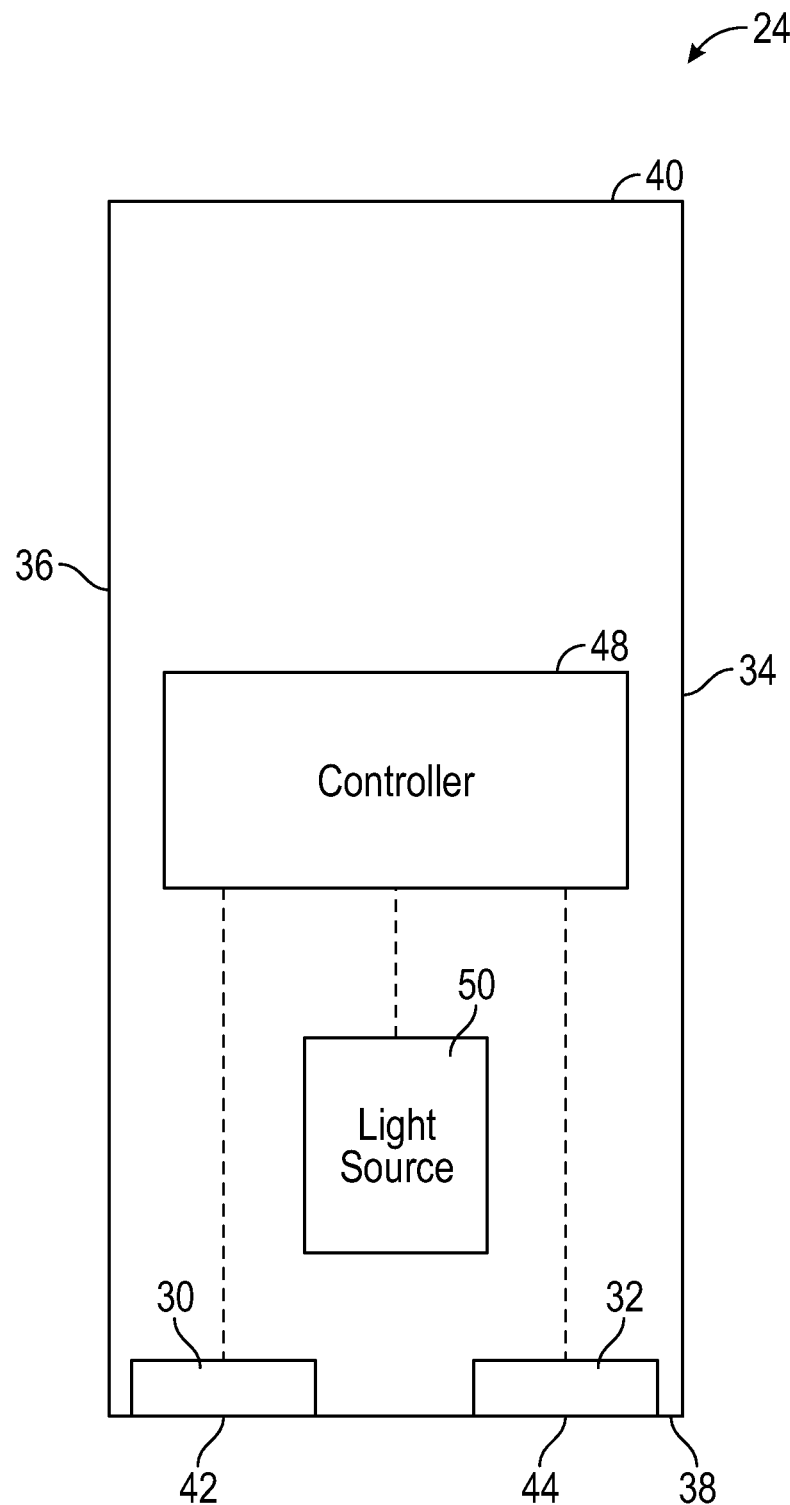
FIG. 3 is a schematic illustration of an embodiment of an infrared flame detector.

Referring now to FIG. 3, the flame detector 24 includes a first sensor 30 and a second sensor 32 disposed in a detector housing 34. The first sensor is configured to detect light emissions in a first infrared wavelength range, and the second sensor is configured to detect light emissions at a second wavelength range, different from the first wavelength range. While in some embodiments, the second wavelength range may be an infrared wavelength range, in other embodiment the second wavelength range may be, for example, an ultraviolet wavelength range. The second sensor In some embodiments the detector housing 34 is cylindrical having a housing body 36 and a first end 38 and second end 40. In the illustrated embodiment the first sensor 30 and the second sensor 32 are located in the first end 38 at a first sensor window 42 and a second sensor window 44, respectively. While in the illustrated embodiment the first sensor 30 and the second sensor 32 are located at the first end 38, in other embodiments the sensors 30 and 32 may be located in the housing body 36. In another embodiment, illustrated in FIG. 4, the first sensor 30 and the second sensor 32 share a common sensor window 46.

Referring again to FIG. 3, the sensors 30, 32 are positioned side-by-side at the first end 38. In other embodiments, on the other hand, the sensors 30, 32, may have different relative positions.

The first sensor 30 is configured to detect emissions having a 4.3-4.4 micron wavelength signature. The infrared sensor 32 may be configured to detect emissions having a different wavelength signature, for example 0.88 microns. In some embodiments the second sensor 32 may be configured to detect ultraviolet light signals. The flame detector 24 includes a controller 48, which in some embodiments is located in the detector housing 34. One skilled in the art will readily appreciate, however, that in some embodiments the controller 48 may be located remotely, outside of the detector housing 34. The controller 48 is operably connected the first sensor 30 and the second sensor 32 to receive and evaluate signals from the first sensor 30 and the second sensor 32. The controller 48 includes control logic, which receives signals from the first sensor 30 and the second sensor 32 in a potential flame detection event. The control logic must receive detection signals from both the first sensor 30 and the second sensor 32 in order to positively identify the event as a flame detection. The controller 48 will then trigger one or more alerts or alarms, such as lights or audible alarms to alert the flight crew to the flame detection. This requirement of positive flame detection signals from both the first sensor 30 and the second sensor 32 before triggering alerts or alarms significantly reduces the occurrence of false alarms.

The flame detector 24 further may include an internal light source, such as a light emitting diode (LED) 50 in the detector housing 34. This LED 50 is connected to the controller 48 and allows for periodic self test of the flame detector 24 to ensure that the flame detector 24 is functioning properly. To perform the test, the LED 50 emits signals in the detection range of the first sensor 30 and the second sensor 32. The first sensor 30 and the second sensor 32 detect the light signal emitted from the LED 50 and in turn signal the controller 48. Once the signals are received at the controller from both the first sensor 30 and the second sensor 32, the test is complete and the determination is made by the controller 48 that the flame detector 24 is operating properly. In some configurations, the LED 50 may emit light signals only detectable by one of the sensors 30 or, 32 such that if the controller 48 receives detection signals from both of the sensors 30, 32, the test is unsuccessful and the flame detector 24 is not operating properly. In some configurations, the controller 48 will initiate the test periodically based on, for example, a time-based schedule, or the test may be initiated remotely by, for example, flight crew or maintenance personnel.

Figure 4:
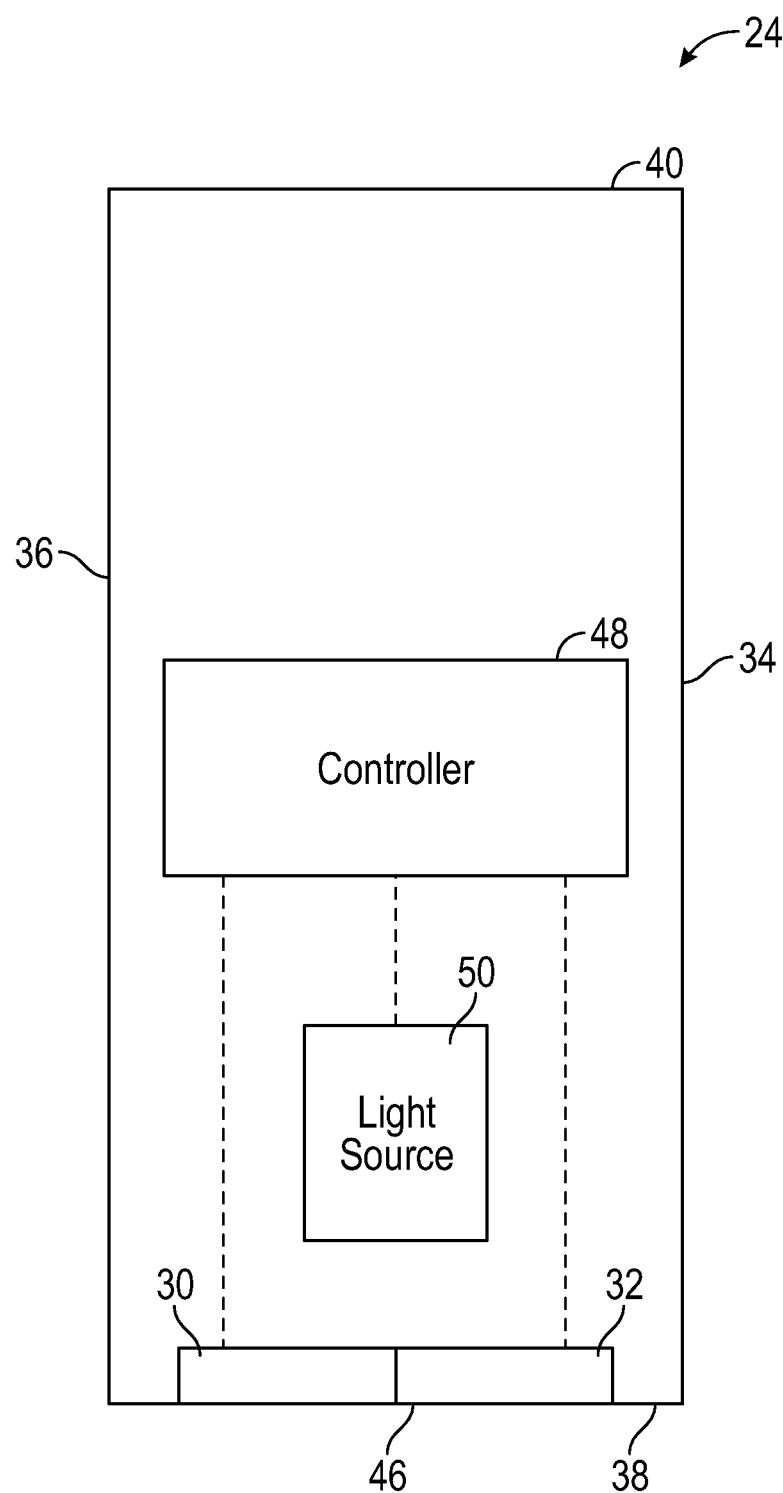
FIG. 4 is a schematic illustration of another embodiment of an infrared flame detector.
Figure 5:
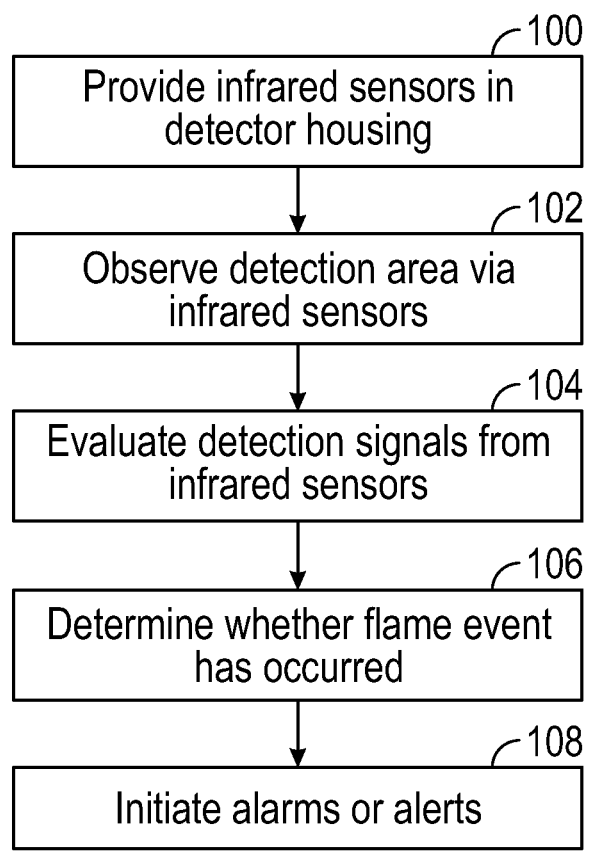
FIG. 5 is a schematic illustration of an embodiment of a method of operating an infrared flame detector.

Referring now to FIG. 5 and with continued reference to FIG. 4, illustrated is a method of operation of the flame detector 24. At block 100, the sensors 30, 32 are provided in the detector housing 34. At block 102, the first sensor 30 observes a detection area and the second sensor 32 observes the same detection area. At block 104, the controller 48 evaluates signals received from the first sensor 30 and the second sensor 32. If flame detection signals are received from both the first sensor 30 and the second sensor 32, the controller 48 determines that a flame event has occurred at block 106. If a flame event is detected at block 106, the controller 48 initiates one or more alerts or alarms at block 108.

The flame detector 24 configurations disclosed herein reduce the occurrence of false alarms thus improving flight crew confidence in the flame detector 24. Further, the flame detector 24 allows for a self-test via inclusion of the LED 50. Further, in some embodiments the flame detector 24 can simply replace a prior art flame detector via retrofit, by packaging the sensors 30, 32 into the housing 34, which is a same size as a prior art housing.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodi-

What is claimed is:

1. A flame detector for an aircraft, comprising:
a housing;
two sensors disposed in the housing to detect light signals indicative of a flame event, the two sensors including:
a first sensor configured to detect light signals at a first infrared wavelength range; and
a second sensor configured to detect light signals at a second wavelength range;
a controller to receive signals from the two sensors, and to determine the presence of the flame event only if the signals indicative of the flame event are received from both of the two sensors; and
a light source disposed in the housing to emit light signals for test of the flame detector, wherein the light source is a light emitting diode configured to emit light signals only detectable by one of the two sensors.

2. The flame detector of claim 1, wherein the two sensors detect emissions having different wavelength signatures.

3. The flame detector of claim 1, wherein a first sensor of the two infrared sensors is configured to detect infrared emissions having a 4.3-4.4 micron signature.

4. The flame detector of claim 3, wherein a second sensor of the two sensors is configured to detect emissions having a 0.88 micron signature.

5. The flame detector of claim 1, wherein the two sensors share a common window in the housing.

6. The flame detector of claim 1, wherein the controller is disposed in the housing.

7. A flame detector system of an aircraft, comprising:
an engine disposed in an engine compartment; and
a flame detector disposed in the engine compartment, the flame detector including:
a housing;
two sensors disposed in the housing to detect light signals indicative of a flame event, the two sensors including:
a first sensor configured to detect light signals at a first infrared wavelength range; and
a second sensor configured to detect light signals at a second wavelength range;
a controller to receive signals from the two sensors, and to determine the presence of the flame event only if signals indicative of the flame event are received from both of the two sensors; and
a light source disposed in the housing to emit light signals for test of the flame detector, wherein the light source is a light emitting diode configured to emit light signals only detectable by one of the two sensors.

8. The flame detector system of claim 7, wherein the two sensors detect emissions having different wavelength signatures.

9. The flame detector system of claim 7, wherein a first sensor of the two sensors is configured to detect infrared emissions having a 4.3-4.4 micron signature.

10. The flame detector system of claim 9, wherein a second sensor of the two sensors is configured to detect emissions having a 0.88 micron signature.

11. The flame detector system of claim 7, wherein the two sensors share a common window in the housing.

12. The flame detector system of claim 7, wherein the controller is disposed in the housing.

13. A method of detecting a flame event, comprising:
providing two sensors in a detector housing, the two sensors including:
a first sensor configured to detect light signals at a first infrared wavelength range; and
a second sensor configured to detect light signals at a second wavelength range;
observing a detection area via the two sensors;
evaluating detection signals received from the two sensors at a controller;
determining the presence of a flame event only if detection signals are received from both of the two sensors; and
testing the flame detector via a light source disposed in the housing, wherein the light source is a light emitting diode configured to emit light signals only detectable by one of the two sensors.

14. The method of claim 13, further comprising initiating one or more alarms or alerts when the presence of a flame event is determined.

15. The method of claim 13, wherein the two sensors detect emissions having different wavelength signatures.

16. The method of claim 13, wherein a first sensor of the two sensors is configured to detect infrared emissions having a 4.3-4.4 micron signature.

17. The method of claim 16, wherein a second sensor of the two sensors is configured to detect emissions having a 0.88 micron signature.

* * * * *